United States Patent [19]

Itoh et al.

[11] 4,134,856

[45] Jan. 16, 1979

[54] CATALYST FOR HYDRO-REFINING HYDROCARBON OILS

[75] Inventors: Takuji Itoh, Sayama; Satoshi Sakurada, Omiya; Shohei Okano, Tokorozawa; Takashi Obayashi, Ohi, all of Japan

[73] Assignee: Toa Nenryo Kogyo Kabushiki Kaisha, Tokyo, Japan

[21] Appl. No.: 747,431

[22] Filed: Dec. 3, 1976

Related U.S. Application Data

[62] Division of Ser. No. 668,609, Mar. 19, 1976, Pat. No. 4,008,149.

[30] Foreign Application Priority Data

Apr. 18, 1975 [JP] Japan .................................. 50/47271

[51] Int. Cl.$^2$ ....................... B01J 21/04; B01J 21/12; B01J 23/84; B01J 27/04
[52] U.S. Cl. ..................................... 252/439; 252/432; 252/455 R; 252/455 Z; 252/465
[58] Field of Search .................. 252/432, 439, 455 R, 252/455 Z, 465

[56] References Cited

U.S. PATENT DOCUMENTS

| | | | |
|---|---|---|---|
| 3,383,301 | 5/1968 | Beuther et al. ...................... | 208/216 |
| 3,770,618 | 11/1973 | Adams et al. ......................... | 208/216 |
| 3,814,683 | 6/1974 | Christman et al. .................. | 208/216 |
| 3,876,523 | 4/1975 | Rosinski et al. ..................... | 208/216 |
| 3,900,427 | 8/1975 | Riley et al. ....................... | 252/465 X |
| 3,993,598 | 11/1976 | Arey et al. ....................... | 252/465 X |

*Primary Examiner*—W. J. Shine
*Attorney, Agent, or Firm*—Reuben Miller

[57] ABSTRACT

A hydro-refining catalyst comprising at least one hydrogenation metal component supported on an alumina or alumina-containing carrier containing from about 5 to about 25 wt. % silica, said catalyst having a specific surface area in the range of from about 250 to about 300 m$^2$/g and a pore volume distribution characterized in that (1) the volume of pores having a diameter of 60 to 150 Å is at least about 80% of the volume of pores having a diameter of 0 to 150 Å, (2) the volume of pores having a diameter of 150 to 300 Å is less than about 20% of the volume of pores of 0 to 300 Å, (3) the volume of pores having a diameter of 150 to 2,000 Å is less than about 0.01 ml/g, (4) the volume of pores having a diameter of 0 to 600 Å is in the range of from about 0.45 to about 0.60 ml/g. The catalyst is used in the hydro-refining of heavy hydrocarbon oils containing sulfur, nitrogen and metal contaminants.

6 Claims, No Drawings

CATALYST FOR HYDRO-REFINING HYDROCARBON OILS

This is a division of application Ser. No. 668,609, filed Mar. 19, 1976, now U.S. Pat. No. 4,008,149.

PROCESS OF HYDROREFINING HYDROCARBON OILS

This invention relates to a process of hydro-refining hydrocarbon oils. More particularly, the invention relates to a process of hydro-refining heavy hydrocarbons using a hydro-refining catalyst comprising a metal component having hydrogenating activity which is deposited on a support, said supported catalyst having a specific pore size distribution. More specifically, the invention relates to a hydrodesulfurization process comprising contacting a hydrocarbon distillate or residual oil containing sulfur and nitrogen compounds with hydrogen in the presence of a catalyst having a novel pore structure to thereby remove these sulfur and nitrogen compounds. Moreover, the invention discloses a catalyst suitable for hydro-refining heavy hydrocarbon oils containing sulfur compounds, nitrogen compounds, asphalt and metal-containing compounds.

The catalytic hydro-desulfurization of sulfur-containing hydrocarbon oils has long been known in the art.

Heavy hydrocarbon oils containing heavy components which are obtained as residual oils on atmospheric or vacuum distillation of crude oils take important roles as fuels in power plants and industrial plants or as fuels for large ships. However, these heavy oils have a higher sulfur content than light distillates, and when burned in a furnace or the like, sulfur compounds convert to sulfur dioxide and sulfuric anhydride. These acidic substances are discharged together with exhaust gases, causing air pollution and other environmental pollution problems. Further, these residual oils contain nitrogen compounds as well as sulfur compounds and generate nitrogen oxides [NOx (in which x is mainly 1 or 2)] which contribute to air pollution in the form of photochemical smog. Sulfur and nitrogen compounds in hydrocarbon oils can be separated from hydrocarbon oils as hydrogen sulfide, ammonia and the like by hydrogenation in the presence of a catalyst.

However, hydrocarbon oils, especially residual oils, contain catalyst poisons such as organic compounds of vanadium, iron and other metals, which not only promptly deactivate the activity of catalysts but prevent their regeneration as well. Moreover, residual oils comprise polynuclear compounds such as asphaltenes and asphalt, and these compounds are deposited on the surfaces of catalysts in hydrodesulfurization and hydrodenitrogenation processes to cause formation of carbonaceous deposits which plug the pores of the catalysts, whereby the activity of such catalysts is degraded. Accordingly, various technical difficulties are involved in the hydro-refining of heavy hydrocarbon oils.

The term "hydro-refining" used herein is a generic term emcompassing processes for the contacting of hydrocarbon oils with hydrogen, which include hydro-refining conducted under relatively mild reaction conditions, hydro-refining conducted under relatively severe reaction conditions to effect certain cracking, hydroisomerization, or hydrodealkylation reactions, and other reactions of hydrocarbon oils carried out in the presence of hydrogen. For example, hydrorefining includes the hydrodesulfurization, hydrodenitrogenation and hydrocracking of distillates and residual oils obtained by the atmospheric pressure or vacuum distillation of crude oils.

As it has been known that sulfur compounds in petroleum fuels are converted on combustion to sulfur dioxide, one of the known air pollutants, various proposals have heretofore been made as regards the hydro-refining of residual oils for reducing the amount of sulfur dioxide emission. For example, since it is expected that the pore distribution in the hydro-refining catalyst will greatly influence catalyst activity and activity maintenance in the hydrodesulfurization and hydrodenitrogenation of hydrocarbon oils containing asphalt and metal-containing compounds, proposals have been made to (1) a process using a catalyst characterized by a pore size distribution wherein the volume of pores having a radius larger than 80 Å is reduced below 10% of the total pore volume so that penetration of asphalt and metal-containing compounds into the catalyst pores is prevented, (2) a process for the hydrodesulfurization of such residual oils using a catalyst whose pore volume is distributed over wide range of pore sizes and (3) a catalyst for hydrodesulfurization of crude oils or topped crude oils in which the volume of pores having a diameter of about 50 to about 100 Å is at least 50% of the total pore volume and the volume of pores having a diameter of 0 to 50 Å is at most 25% of the total pore volume. In each of these known hydrodesulfurization processes, the distribution of pores having a radius larger than 300 Å, namely macropores, in the catalysts used had not been sufficiently investigated and their influences on catalyst activities was not observed. In short, all of the conventional techniques are concentrated on so-called micro-pores. However, by arranging the pore size distribution in micro-pores alone, it is impossible to improve the catalyst activity and activity maintenance of such catalysts when used for hydro-refining of hydrocarbon oils containing large quantities of sulfur compounds, nitrogen compounds, metal compounds, asphalt and other impurities, such as residual oils obtained by atmospheric or vacuum distillation and heavy gas oils obtained by vacuum distillation.

Accordingly, it is an object of the present invention to provide a process of hydro-refining heavy hydrocarbon oils according to which the foregoing difficulties can be overcome and desulfurization, denitrogenation and removal of metals can be accomplished effectively, particularly with catalysts having high activities and high activity maintenance properties.

This invention is based on the discovery that a catalyst in which the volume of pores having a diameter of 150 to 2,000 Å (as measured according to the mercury porosimetric method) is less than about 0.01 ml/g, the volume of pores having a diameter of 60 to 150 Å (as measured according to the nitrogen absorption method) is at least about 80% of the volume of pores having a diameter of 0 to 150 Å and the volume of pores having a diameter of 150 to 300 Å (as measured according to the nitrogen absorption method) is less than about 20% of the volume of pores having a diameter of 0 to 300 Å, has a very excellent desulfurizing activity.

More specifically, in accordance with this invention, there is provided a process of hydro-refining hydrocarbon oils characterized by contacting a hydrocarbon oil with hydrogen in the presence of a hydro-refining catalyst comprising at least one metal hydrogenation component supported on an alumina or alumina-containing carrier including about 5 to about 25% by weight of silica, said catalyst being characterized in that (1) the volume of pores having a diameter of 60 to 150 Å is at least about 80% of the volume of pores having a diameter of 0 to 150 Å, (2) the volume of pores having a diameter of 150 to 300 Å is less than about 20% of the volume of pores having a diameter of 0 to 300 Å, (3) the volume of pores having a diameter of 0 to 600 Å is in the range of from about 0.45 to about 0.60 ml/g. [the pore volumes mentioned in (1), (2) and (3) being those as measured according to the nitrogen adsorption method], (4) the volume of pores having a diameter of 150 to 2,000 Å as measured according to the mercury porosimetric method is less than about 0.01 ml/g, and (5) the specific surface area is in the range of from about 250 to about 300 m²/g.

A feature of the process of this invention for hydro-refining hydrocarbon oils is that a hydrocarbon oil is contacted with hydrogen in the presence of a hydro-refining catalyst in which the volume of pores having a diameter of 150 to 300 Å (as measured according to the nitrogen adsorption method) is less than about 20% of the volume of pores having a diameter of 0 to 300 Å. Another feature of the process of this invention is that there is used a catalyst in which the volume of pores having a diameter of 150 to 2,000 Å (as measured according to the mercury porosimetric method) is less than about 0.01 ml/g. These features are based on the basic findings that in hydro-refining heavy hydrocarbon oils, especially residual oils, by contacting them with hydrogen in the presence of hydro-refining catalysts, it is necessary to reduce the volume of the macro-pores in the catalysts in order to prevent asphalt and resin components contained in these oils from penetrating into catalysts and causing deactivation. In order to prevent cracking of hydrocarbon oils and plugging of catalyst pores with asphalt and resin components, it is preferred to reduce pores having a diameter smaller than 60 Å. Accordingly, in the catalyst of the present invention, pores are concentrately distributed in the diameter region of 60 to 150 Å as well as being distributed over a broad range.

It is known that solid acids such as alumina, silica, alumina-silica and magnesia are catalyst components suitable for desulfurization and denitrogenation of hydrocarbon oils. It is important, however, to maintain a desired acidity in such solid acid and to adjust its catalytic activity and selectivity in the hydro-refining of hydrocarbon oils by controlling both the silica content and specific pore structure of the solid carrier component of that catalyst. This selectivity is very important for reducing the consumption of hydrogen and preventing deactivation of the catalyst owing to formation of carbonaceous components via the cracking reaction.

Accordingly, in hydrodesulfurization or hydrodenitrogenation processes, as pointed out hereinabove, it is necessary that the silica content in an alumina-containing carrier of a catalyst should be about 5 to about 25% by weight, preferably about 8 to about 20% by weight, in order to control the consumption of hydrogen and the formation of coke by excessive cracking reactions.

The reason why such specific pore size distribution in the catalyst disclosed by this invention has excellent effects in the activity and the activity-maintenence of catalysts used in the hydro-refining of hydrocarbon oils has not been completely elucidated, but it is believed that because the pore size distribution range is made relatively broad, when asphalt, resin components and metal-containing compounds in the feedstock are deposited on the catalyst surface, though pores having a very small diameter are plugged and the active sites of the catalyst are completely isolated, metal-containing compounds, asphalt and resin components are similarly deposited but do not completely plug the pores having a diameter increased in a specific range and allow hydrocarbon molecules and sulfur molecules to approach the active sites, which will lead to a high performance.

As hereinabove noted, an alumina or alumina-containing carrier having a silica content of about 5 to about 25% by weight is used as the carrier of the catalyst to be used in this invention. By the term "alumina-containing carrier" are meant compositions obtained by incorporating into alumina, preferably from about 1 to about 10% by weight based on the alumina or alumina-silica, of one or more of other refractory inorganic oxide carrier substances such as magnesia, calcium oxide, zirconia, titania, boria, hafnia and crystalline zeolites. Silica gives strong acid sites to the alumina-silica and increases the cracking activity of the catalyst, but magnesia, for example, decreases strong acid sites of alumina-silica or the like and increases weak acid sites to improve the selectivity of the catalyst. As the alumina, γ-alumina, λ-alumina, η-alumina and mixtures thereof are preferably employed. Any of alumina components giving the pore size distribution and physical properties as specified in this invention can be used in this invention.

As the method for the production of the alumina-silica carrier, there can be adopted a method comprising mixing gels of alumina and silica prepared separately in advance, a method comprising immersing silica gel in a solution of an alumina compound, adding a suitable amount of a basic substance to the solution and thereby depositing alumina gel on silica gel, and a method comprising adding a basic substance to a homogeneous solution of a water-soluble aluminum compound and a water-soluble silicon compound and thereby coprecipitating both of the components. In order to obtain a catalyst having the pore size distribution and physical properties specified in this invention, it is preferred to add a hydroxycarboxylic acid or an aminodicarboxylic acid or a salts thereof when precipitating and aging from a starting material. Conditions for precipitation and aging hydrates of alumina and silica, such as temperature and time conditions, are adjusted so as to attain the specific pore size distribution and physical properties of the hydro-refining catalyst to be used in this invention.

As for the materials, there can be employed, for example, water-soluble acidic aluminum compounds and alkaline aluminum compounds, such as the sulfate, chloride or nitrate of aluminum, alkali metal aluminates, aluminum alkoxides and other inorganic and organic aluminum-containing salts. As the water-soluble silicon compound, there can be preferably employed alkali metal silicates (in which the $Na_2O:SiO_2$ ratio is preferably in the range of from 1:2 to 1:4), tetraalkoxysilanes, ortho-silicic acid esters and other silicon-containing compounds. These aluminum and silicon compounds can be used in the form of aqueous solutions, and the concentration in the aqueous solution is not particularly critical and it may optionally be adopted. Preferably, the concentration of the aluminum compound in the aqueous solution is adopted within a range of from about 0.1 to about 4.0 moles per liter. The method of coprecipitation of alumina and silica is preferably employed for the production of the alumina-silica carrier or other carrier component to be used in the catalyst of this invention.

A preferred embodiment of the method for the preparation of an alumina-silica carrier suitable for practicing the hydro-refining process of this invention will now be described. An aqueous solution of an alkali hydroxide or alkali aluminate and an alkali silicate is added to an acidic aluminum aqueous solution (having preferably a concentration of about 0.3 to about 2 moles per liter), and at room temperature the pH of the mixture is adjusted to about 6.0 to about 11.0, preferably about 8.0 to about 10.5, to thereby form a hydrogel or hydrosol of alumina-silica. Then, aqueous ammonia, acetic acid or the like is added to adjust the pH and the suspended solution is maintained at about 50 to about 98° C. for at least 2 hours. After completion of this treatment, the precipitate is recovered by filtration, washed with ammonium acetate and water to remove impurity ions, and dried and calcined according to customary procedures to thereby obtain a desired carrier. The drying is accomplished by maintaining the recovered precipitate at a temperature ranging from room temperature to about 200° C. in the presence or absence of oxygen, and the calcination is accomplished by heating the dried precipitate in the presence of oxygen at a temperature of about 200 to about 800° C.

As the metal component having a hydrogenating activity to be supported on the carrier, there are employed one or more metals selected from metals of the Groups VI and VIII of the Periodic Table. More specifically, there are employed one or more of metals selected from metals of the Group VI such as chromium, molybdenum and tungsten, and metals of the Group VIII, such as iron, cobalt, nickel, palladium, platinum, osmium, iridium, ruthenium and rhodium. For the hydrodesulfurization of hydrocarbon oils, there are preferably employed combinations of metals of the Group VI and metals of Group VIII, for example, molybdenum-cobalt, molybdenum-nickel, tungsten-nickel, molybdenum-cobalt-nickel, tungsten-cobalt-nickel and the like. It is possible to incorporate into such active metal components metals of the Group IV, for example, tin, germanium and the like. It is preferred that such metal component having a hydrogenating activity be supported in the form of an oxide and/or a sulfide.

As the method for supporting the metal component on the carrier, there can be adopted (1) a method comprising immersing the carrier in a solution of a soluble salt of the metal component to thereby impregnate the metal component into the carrier or (2) a method comprising coprecipitating the metal component on preparing the carrier, and any of methods known in the art. In order to facilitate the operation procedures and obtain desired physical properties in the catalyst, it is preferred to adopt the impregnation method. The impregnation is accomplished by immersing the carrier in an impregnation solution at room temperature or a temperature higher than room temperature and maintaining the mixture umder such conditions that desired components are sufficiently impregnated in the carrier. The amount and concentration of the impregnation solution are appropriately adjusted so that the metal is deposited in a desired amount. The amount of the carrier immersed in the impregnation solution is decided depending on the desired amount of the metal component to be supported on the carrier. Either the one-impregnation method or the two-impregnation method can be used and chosen appropriately depending on the metal to be supported. More specifically, when two or more metal components are supported, two or more metal components are mixed and a solution of the mixture is used to impregnate the metal components simultaneously (one-impregnation method) of solutions of the metal components are prepared separately and the metal components are impregnated in a succession (two-impregnation method). However, this invention is not particularly limited by these impregnation methods. The form of the catalyst may be cylindrical, granular or tablet-like. These forms can be obtained by such molding methods as extrusion molding, granulation molding and the like. It is preferred that the diameter of the molded catalyst be in the range of from 0.5 to 3.0 mm. The carrier impregnated with the metal component having a hydrogenating activity is separated from the solution, washed with water, dried and calciined. The conditions of drying and calcination may be the same as those adopted for the preparation of the carrier. When the catalyst is used for hydrodesulfurization of heavy hydrocarbon oils. it is preferred that the catalyst be subjected to presulfiding. Preferred amounts of metals to be supported are about 0.1 to about 20% by weight, as calculated as the oxide, based on the catalyst in the case of a metal of the Group VIII and about 5 to about 20% by weight, as calculated as the oxide, based on the catalyst in the case of a metal of the Group VI.

The finished catalyst, as pointed out hereinbefore, is one comprising at least one hydrogenation metal component supported on an alumina or alumina-containing carrier including about 5 to about 25% by weight of silica, said catalyst being characterized in that (1) the volume of pores having a diameter of 60 to 150 Å is at least about 80% of the volume of pores having a diameter of 0 to 150 Å, (2) the volume of pores having a diameter of 150 to 300 Å is less than about 20% of the volume of pores having a diameter of 0 to 300 Å, (3) the volume of pores having a diameter of 0 to 600 Å as measured according to the nitrogen adsorption method is in the range of from about 0.45 to about 0.60 ml/g., [the pore volumes mentioned in (1), (2) and (3) being those as measured according to the nitrogen adsorption method], (4) the volume of pores having a diameter of 150 to 2,000 Å as measured according to the mercury porosimetric method is less than about 0.01 ml/g., and (5) the specific surface area is in the range of from about 250 to about 300 m$^2$/g. The catalyst is further characterized by a surface area of about 250 to about 300 m$^2$/g, a total pore volume of about 0.5 to about 1.0 ml/g, a bulk density of about 0.5 to about 1.0 g/ml and a side crushing strength of about 0.8 to about 3.0 Kg/mm. This catalyst has a very excellent activity for the hydrorefining of hydrocarbon oils. The nitrogen adsorption method and mercury porosimetric method for the measurement of pore volumes of catalysts are described in P.H. Emmett et al, Catalysts, 1, 123 (1959) (Reinhold Publishing Co.) and Lectures on Catalyst Engineering, Vol. 4, pages 69 to 78 (1964) (Chijin Shokan). In the mercury porosimetric method, the contact angle of mercury to the catalyst is 140° and the surface tension is 480 dynes/cm, and it is presumed that all the pores have a cylindrical form. In connection with the nitrogen adsorption method, various methods based on the multimolecule layers have been proposed, and the BJH method [E.P. Barrett, L.G. Joyner and P.P. Halanda; J. Amer. Chem. Soc., 73, 373 (1951)] and the CI method [R.W. Cranston and F.A. Inkley; Advances in Catalysis, IX, 143 (1957) (New York Academic Press)] are generally adopted. Data of pore volumes mentioned in the instant specification are those obtained by using the adsorption sides of adsorption isothermic curves and making the calculation according to the DH method [D. Dollimore and G. R. Heal; J. Appl. Chem., 14, 109 (1964)].

The hydrodesulfurization of heavy hydrocarbon oils according to this invention will now be described. Heavy hydrocarbon oils contain sulfur and nitrogen compunds, asphalt and metal-containing compounds and they have a boiling point substantially higher than about 480° C., and they include residual oils obtained by the atmospheric pressure distillation or vacuum distillation of crude oils. For example, a residual oil containing about 30 to about 100% by weight of hydrocarbon components having a boiling point substantially higher than about 480° C. contains in general about 1 to about 10% by weight of sulfur content, about 0.1 to about 1% by weight of nitrogen content, about 10 to about 1,000 ppm of metals and about 1% by weight of carbon residue (as determined according to the Conradson carbon residue test). Vacuum gas oils and heavy cracked oils are examples of oils which can be used as the heavy hydrocarbon oil feedstock of the hydro-refining process of this invention. A vacuum gas oil is a heavy distillate containing considerable amounts of sulfur, nitrogen compounds and metal compounds obtained by subjecting an atmospheric residual oil to vaccum distillation and containing fractions having a boiling point in the range of about 250 to about 560° C. For example, a vacuum gas oil obtained from Middle East crude oil has about 2 to about 4% by weight of sulfur contents, about 0.05 to about 0.2% by weight of nitrogen contents and about 0.1 to about 1% by weight of carbon residue. A heavy cracked oil is one obtained by thermal cracking of a residual oil and having a boiling point higher than about 200° C. For example, distillates obtained by coking or visbreaking of residual oils can be used. The above-mentioned atmospheric residual oils, vacuum residual oils, vacuum gas oils and heavy cracked oils, and mixtures thereof may be employed as feedstocks to the hydro-refining process of this invention. Reaction conditions are selected appropriately depending on the kind of feedstocks, desulfurization or denitrogenation percentages and the like. More specifically, the reaction is generally conducted under the following conditions: a reaction temperature of from about 350 to about 450° C., a reaction pressure of from about 30 to about 200 Kg/cm$^2$, a hydrogen-containing gas flow rate of from about 50 to about 1,500 l/l and a liquid space velocity of from about 0.2 to about 2.0 V/H/V. The hydrogen concentration in the hydrogen-containing gas may be in the range of from about 60 to about 100%.

The catalyst to be used in the process of this invention is characterized in that the deactivation during use is very low, and a high desulfurization can be attained even under mild reaction conditions, especially at a low reaction pressure. In performing the hydrodesulfurization, the catalyst may be used in either a fixed bed, a fluidized bed or a moving bed reactor. In view of the equipment and operation facilities, it is preferred that the fixed bed be adopted. Further, it is possible to obtain a high degree of desulfurization by conducting the hydrodesulfurization process using two or more reaction columns connected to each other. Still further, the catalyst may be packed in a guard reactor for removing metals, which is installed before a main reactor used for hydrodesulfurization and hydrodenitrogenation processes. It is preferred that the catalyst be subjected to presulfiding before it is actually used for the reaction. The presulfiding may be conducted in a reactor to be used for the main reaction. More specifically, the calcined catalyst is contacted with a sulfur-containing distillate at a temperature of about 150 to about 400° C., a pressure (total pressure) of about 20 to about 100 Kg/cm$^2$ and a liquid space velocity of about 0.3 to about 2.0 V/H/V in the presence of about 50 to about 1,500 l/l of a hydrogen-containing gas. After completion of the sulfiding treatment, the sulfur-containing distillate is exchanged with a feedstock, and operation conditions suitable for desulfurization are set and the operation is started. In addition to the above sulfiding treatment, it is possible to adopt a presulfiding method in which the catalyst is directly contacted with hydrogen sulfide or some other sulfur-containing compound or a method in which such sulfur-containing compound is incorporated in a suitable distillate and the catalyst is contacted with the mixture.

EXAMPLE 1

Aluminum sulfate, sodium hydroxide and water glass No. 3 were used as the main starting materials and an alumina-silica base material was prepared while adjusting the preparation conditions appropriately. The alumina-silica base material was extruded into cylindrical shape having a diameter of about 1.5 mm by means of an extruder and then calcined. Then, molybdenum and cobalt were supported as the metal components on the carrier to obtain a catalyst A shown in Table 1. A vacuum gas oil derived from a Middle East crude oil which had properties shown in Table 3, were subjected to the hydro-refining treatment using the catalyst A under conditions indicated in Table 2, to obtain results shown in Table 3. Further, results of comparative tests made on this catalyst A and a comparative catalyst described in Comparative Example 1 are shown in Table 6-B.

TABLE 1

Catalyst A

| Pore Diameter (Å) | Pore Volume (ml/g) |
|---|---|
| 0–60 | 0.045 |
| 60–150 | 0.368 |
| 150–300 | 0.088 |
| 0–600 (nitrogen adsorption method) | 0.520 |
| 150–150,000 (mercury porosimetric method) | 0.023 |
| 150–2,000 (mercury porosimetric method) | 0.007 |
| [PV(60–150)/PV(0–150)] × 100 (%) | 89.1 |
| [PV(150–300)/PV(0–300)] × 100 (%) | 17.4 |
| Specific Surface Area (m$^2$/g) | 259 |
| Bulk Density (g/ml) | 0.74 |
| Side Crushing Strength (kg/mm) | 1.1 |
| Particle Size of Catalyst (mm) | 1.35 |
| Composition (wt. %) | |
| CoO | 4.02 |
| MoO$_3$ | 15.4 |
| SiO$_2$ | 11.9 |
| CaO | 0.2 |
| Al$_2$O$_3$ | balance |

TABLE 2

| Amount Packed of Catalyst (ml) | 100 |
|---|---|
| Temperature (° C) | 315, 340 or 360 |
| Pressure (kg/cm$^2$) | 55 |
| Liquid Space Velocity (V/H/V) | 0.5 or 1.0 |
| Flow Rate of Hydrogen to Feedstock (l/l) | 550 |

Table 3

| | Feed Stock | Hydro-Refined Oil | | | | | |
|---|---|---|---|---|---|---|---|
| | | Reaction Temperature (° C) | | | | | |
| | | 315 | | 340 | | 360 | |
| | LHSV | 0.5 | 1.0 | 0.5 | 1.0 | 0.5 | 1.0 |
| Total sulfur content (WT. %) | 2.04 | 0.44 | 0.63 | 0.18 | 0.27 | 0.13 | 0.08 |
| Desulfurization percentage (%) | — | 78.4 | 69.1 | 91.2 | 86.8 | 93.6 | 96.3 |
| Total nitrogen content (wt. %) | 0.146 | 0.113 | 0.107 | 0.082 | 0.102 | 0.048 | 0.090 |
| Denitrogenation percentage (%) | — | 22.6 | 26.7 | 43.8 | 30.1 | 67.1 | 38.3 |
| Specific gravity (15/4° C) | 0.9200 | 0.9042 | 0.9012 | 0.8958 | 0.8987 | 0.8909 | 0.8943 |
| Conradson Carbon Residue (wt. %) | 0.405 | — | — | — | — | — | — |
| Desulfurization relative activity | — | 135 | | 130 | | 126 | |
| Denitrification relative activity | — | 134 | | 156 | | 130 | |

Relative activities were determined in the following manner:

(1) Desulfurization relative activity = (Ri/Rs) × 100 in which Ri stands for a 1.5-order desulfurization reaction rate constant of a catalyst (i) to be tested under standard operation conditions, and Rs stands for a 1.5-order desulfurization reaction rate constant of a standard catalyst under standard operation conditions.

(2) Denitrogenation relative activity = (Qi/Qs) × 100 in which Qi stands for a 1-order denitrogenation reaction rate constant of a catalyst to be tested under standard operation conditions, and Qs stands for a 1-order denitrogenation reaction rate constant of a standard catalyst under standard operation conditions.

COMPARATIVE EXAMPLE 1

A vacuum residue derived from a Middle East crude oil, which had properties shown in Table 3, was used as the feedstock and subjected to the hydro-refining treatment using a commercially available hydro-refining catalyst having physical and chemical properties shown in Table 4, under operation conditions shown in Table 5 to obtain results shown in Table 6-A.

Table 4

| Commercially Available Catalyst | |
|---|---|
| Pore Diameter (Å) | Pore Volume (ml/g) |
| 0–60 | 0.088 |
| 60–150 | 0.308 |
| 150–300 | 0.069 |
| 0–600 (nitrogen adsorption method) | 0.488 |
| 150–150000 (mercury porosimetric method) | 0.024 |
| 150–2000 (mercury porosimetric method) | 0.012 |
| [PV(60–150)/PV(0–150)] × 100 (%) | 77.8 |
| [PV(150–300)/PV(0–300)] × 100 (%) | 14.8 |
| Surface Area (m²/g) | 223 |
| Bulk Density (g/ml) | 0.80 |
| Side Crushing Strength (Kg/mm) | 1.1 |
| Catalyst Particle Size (mm) | 1.5 |
| Composition (wt. %) | |
| CoO | 3.5 |
| MoO$_3$ | 13.8 |
| SiO$_2$ | 1.0 |
| CaO | — |

Table 4-continued

| Commercially Available Catalyst | |
|---|---|
| Pore Diameter (Å) | Pore Volume (ml/g) |
| Al$_2$O$_3$ | balance |

Table 5

| | |
|---|---|
| Amount Packed of Catalyst (ml) | 100 |
| Temperature (° C) | 315, 340 or 360 |
| Pressure (Kg/cm²) | 55 |
| Liquid Space Velocity (V/H/V) | 0.5 or 1.0 |
| Flow Rate of Hydrogen to Feedstock (l/l) | 550 |

Table 6-A

| | Feed-Stock | Hydro-Refined Oil | | | | | |
|---|---|---|---|---|---|---|---|
| | | Reaction Temperature (C°) | | | | | |
| | | 315 | | 340 | | 360 | |
| | LHSV | 0.5 | 1.0 | 0.5 | 1.0 | 0.5 | 1.0 |
| Total sulfur content (wt. %) | 2.04 | 0.60 | 0.81 | 0.25 | 0.39 | 0.10 | 0.19 |
| Desulfurization percentage (%) | — | 70.6 | 60.3 | 87.7 | 80.9 | 95.1 | 90.7 |
| Total nitrogen content (wt. %) | 0.146 | 0.123 | 0.113 | 0.102 | 0.113 | 0.072 | 0.096 |
| Denitrification percentage (%) | — | 15.8 | 22.6 | 30.1 | 22.6 | 50.7 | 34.2 |
| Specific gravity (15/4° C) | 0.9200 | 0.9032 | 0.9061 | 0.8968 | 0.9002 | 0.8924 | 0.8963 |
| Conradson Carbon Residue (wt. %) | 0.405 | — | — | — | — | — | — |

Table 6-B

| | Commercially Available Catalyst of Comparative Example 1 | Catalyst of Example 1 of this Invention |
|---|---|---|
| Silica Content (wt.%) | 1.5 | 11.9 |
| PV [60–150 Å] / PV [0–150 Å] | 77.8 | 89.1 |
| PV [150–300 Å] / PV [0–300 Å] | 14.8 | 17.4 |
| Volume of Pores of 150–2000Å (ml/g) | 0.012 | 0.007 |
| Specific Surface Area (m²/g) | 223 | 259 |
| Volume of Pores of 0–600 Å (ml/g) | 0.488 | 0.520 |
| Desulfurization Relative Activity | 100 | 130 |
| Denitrogenation Relative Activity | 100 | 138 |

COMPARATIVE EXAMPLE 2

The commercially available catalyst shown in Comparative Example 1 was used for the hydrodesulfurization of a residual oil obtained by the atmospheric pressure distillation of a Middle East crude oil, which had properties shown in Table 7, under operating conditions shown in Table 8. The experiment was conducted so that the temperature was gradually elevated so as to obtain always a refined oil having a certain total sulfur content. Other conditions (liquid space velocity, hydrogen flow rate and pressure) are kept constant as shown in Table 8. Obtained results are shown in Table 9.

Table 7

Properties of Residual Oil Obtained by Atmospheric Pressure Distillation of Middle East Crude Oil

| | |
|---|---|
| Specific Gravity (15/4° C) | 0.9612 |
| Total Sulfur Content (wt.%) | 2.60 |
| Total Nitrogen Content (wt.%) | 0.333 |
| Nickel Content (ppm) | 35 |
| Vanadium Content (ppm) | 108 |
| Sodium Content (ppm) | 11 |
| Conradson Carbon Residue, wt.% | 8.96 |

Table 8

Operation Conditions

| | |
|---|---|
| Amount Packed of Catalyst (ml) | 200 |
| Pressure (kg/cm$^2$) | 100 |
| Liquid Hourly Space Velocity (V/H/V) | 0.5 |
| Flow Rate of Hydrogen to Feedstock (l/l) | 550 |

Table 9

| | |
|---|---|
| Temperature Necessary for Obtaining Total Sulfur Content of 0.5% by Weight (° C.) | 375.5 |
| Desulfurization Reaction Velocity Constant of Secondary Order at 370° C. (Initial Activity), wt$^{-1}$ . hr$^{-1}$ | 0.70 |
| Coefficient of Deactivation*(° C/day) | 0.37 |

*: The coefficient of the deactivation means the temperature to be elevated per day to compensate for the deactivation of the catalyst so as to obtain a refined oil having a constant total sulfur content.

EXAMPLE 2

The feedstock shown in Comparative Example 2 was subjected to the hydrodesulfurization test in the same manner as in Comparative Example 2 by using the catalyst of this invention shown in Example 1. Obtained results are shown in Table 10. Comparison of results obtained in this Example with results of Comparative Example 2 is illustrated in Table 11.

Table 10

| | |
|---|---|
| Temperature Necessary for Obtaining Total Sulfur Content of 0.5% by Weight (° C.) | 343.0 |
| Desulfurization Reaction Velocity Constant of Secondary Order at 371° C. (wt.$^{-1}$ . hr.$^{-1}$) | 1.87 |
| Coefficient of Deactivation*(° C/day) | 0.54 |

*: The coefficient of the deactivation means the temperature to be elevated per day to compensate for the deactivation of the catalyst so as to obtain a refined oil having a constant total sulfur content.

Table 11

Comparison of Comparative Example 2 and Example 2

| | Commercially Available Catalyst of Comparative Example 2 | Catalyst of Example 2 of this Invention |
|---|---|---|
| Desulfurization Reaction Velocity Constant of Secondary Order at 371° C. (wt.$^{-1}$ . hr$^{-1}$) | 0.70 | 1.87 |
| Relative Initial Activity | 100 | 267 |
| Temperature Necessary for Obtaining Total Sulfur Content of 0.5% by Weight (° C.) | 375.5 | 343 |
| Coefficient of Deactivation (° C./day) | 0.37 | 0.54 |
| Relative Value of Deactivation Coefficient | 100 | 146 |
| Relative Value of Catalyst Life* | 100 | 146 |

*: The relative value of the catalyst life means the period during which the feedstock is passed (which may be regarded as the amount fed of the feedstock) under the critical conditions of the catalyst or the operation apparatus under such operation conditions as will provide a certain total sulfur content (% by weight).

What is claimed is:

1. A hydrorefining catalyst comprising at least one hydrogenation metal or an oxide or a sulfide of a metal selected from the group consisting of Group VIB metals and Group VIII metals and mixtures thereof supported on an alumina carrier containing from about 5 to about 25 weight % silica, said catalyst having a specific surface area in the range of from about 250 to about 300 m$^2$/g and a pore volume distribution characterized in that (1) the volume of pores having a diameter of 60–150Å is at least about 80% of the volume of pores having a diameter of 0–150Å, (2) the volume of pores having a diameter of 150–300Å is less than about 20% of the volume of pores of 0–300Å, (3) the volume of pores having a diameter of 0–600Å is in the range of from about 0.45 to about 0.60 ml/g, and (4) the volume of pores having a diameter of 150–2000Å is less than about 0.01 ml/g.

2. A hydro-refining catalyst according to claim 1 wherein said carrier contains from about 8 to about 20 weight % silica.

3. A hydro-refining catalyst according to claim 1 wherein said hydrogenation metal component comprises a mixture of molybdenum and cobalt.

4. A hydro-refining catalyst according to claim 1 wherein said hydrogenation metal component comprises a mixture of molybdenum and nickel.

5. A hydro-refining catalyst according to claim 1 wherein said carrier contains from about 1 to about 10 weight % based on the alumina of a refractory inorganic oxide selected from the group consisting of magnesia, calcium oxide, zirconia, titania, boria, hafnia and crystalline zeolites.

6. A hydro-refining catalyst according to claim 1 wherein said hydrogenation metal component comprises from about 0.1 to about 20 weight % based on the catalyst, of a Group VIII metal and from about 5 to about 20 weight %, based on the catalyst, of a Group VI metal.

* * * * *